(12) United States Patent
Valcourt et al.

(10) Patent No.: US 9,253,549 B2
(45) Date of Patent: Feb. 2, 2016

(54) PROGRAM MODELING TOOL

(75) Inventors: Michael P. Valcourt, Davenport, FL (US); Donald E. Smith, Lexington, MA (US); James F. Di Mattia, Churchville, MD (US); Leonard J. Andrews, Wayland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 231 days.

(21) Appl. No.: 13/561,650

(22) Filed: Jul. 30, 2012

(65) Prior Publication Data

US 2014/0033241 A1    Jan. 30, 2014

(51) Int. Cl.
| | |
|---|---|
| *H04N 7/173* | (2011.01) |
| *H04N 21/647* | (2011.01) |
| *H04N 21/61* | (2011.01) |
| *H04N 21/643* | (2011.01) |
| *H04H 60/07* | (2008.01) |
| *H04L 29/06* | (2006.01) |
| *G06F 17/30* | (2006.01) |
| *H04H 60/31* | (2008.01) |
| *H04L 12/26* | (2006.01) |

(52) U.S. Cl.
CPC ......... *H04N 21/64738* (2013.01); *H04H 60/07* (2013.01); *H04L 65/4076* (2013.01); *H04L 65/602* (2013.01); *H04L 65/80* (2013.01); *H04N 21/6125* (2013.01); *H04N 21/64322* (2013.01); *H04H 60/31* (2013.01); *H04L 43/0876* (2013.01)

(58) Field of Classification Search
CPC ............. H04N 21/64738; H04N 21/6125; H04N 21/64322; H04L 65/80; H04L 65/0876; H04H 60/07; H04H 60/31

USPC .............. 725/9, 10, 95, 118, 119, 98, 96; 370/230.1, 255, 233, 290, 235, 265
See application file for complete search history.

(56) References Cited

U.S. PATENT DOCUMENTS

| | | | | |
|---|---|---|---|---|
| 2008/0148322 | A1* | 6/2008 | Howcroft | H04N 7/17318 725/87 |
| 2011/0131625 | A1* | 6/2011 | Schlack | 725/116 |
| 2011/0321078 | A1* | 12/2011 | Hoshen et al. | 725/14 |
| 2012/0137319 | A1* | 5/2012 | Schooling et al. | 725/16 |
| 2014/0189730 | A1* | 7/2014 | Craner | 725/32 |
| 2015/0046960 | A1* | 2/2015 | Hardin | 725/95 |

OTHER PUBLICATIONS

Cha, Meeyoung et al., "Watching Television Over and IP Network", IMC '08, Oct. 20-22, 2008, Vouliagmeni, Greece.

(Continued)

*Primary Examiner* — Pankaj Kumar
*Assistant Examiner* — Reuben M Brown (57) ABSTRACT

Method, device, and non-transitory storage medium to receive peak viewership parameters that indicate one or more program channels to be modeled; query a device that stores viewership data based on the peak viewership parameters; determine a peak viewership for the one or more program channels; query another device that stores network configuration data pertaining to a program delivery network; obtain channel path information pertaining to the one or more program channels; generate peak channel delivery data based on the channel path information and the peak viewership data; and simulate, based on the peak channel delivery data, resource utilization of the program delivery network stemming from a provisioning of the one or more program channels according to a delivery channel format that is different from another delivery channel format that was used to deliver the one or more program channels to subscribers.

20 Claims, 10 Drawing Sheets

(56) References Cited

OTHER PUBLICATIONS

Qiu, Tongqing et al., "Modeling User Activities in a Large IPTV System", IMC '09, Nov. 4-6, 2009, Chicago, Illinois.

Qiu, Tongqing et al., "Modeling Channel Polpularity Dynamics in a Large IPTV System", SIGMETRICS/Performance '09, Jun. 15-19, 2009, Seattle, Washington.

* cited by examiner

| CHANNEL NAME 405 | BANDWIDTH 410 |
|---|---|
| AT MAX | 5 |
| FIVE STAR MAX | 5 |
| ART | 5 |
| BIG TEN NETWORK (HD) | 20 |
| BLACKBELT TV | 5 |

Fig. 4

| DEVICE ID 505 | START TIME 510 | END TIME 515 | CHANNEL NAME 520 |
|---|---|---|---|
| STB7100 | 2012-06-24 21:45:00:000 | 2012-06-24 22:40:19.000 | BLACKBELT TV |
| | | | |
| | | | |
| ... | ... | ... | ... |
| | | | |

Fig. 5

| STATE 605 | OLT ID 610 | SHELF NO. 615 | SLOT NO. 620 | PORT NO. 625 | STB ID 630 | ONT PROFILE 635 |
|---|---|---|---|---|---|---|
| MD | EKRGMDELDL4 | 5 | 9-9 | 1 | 0007452891311 | MANUFACTURER, MODEL, ID |
| --- | --- | --- | --- | --- | --- | --- |

Fig. 6

| OLT ID 705 | COUNT 710 | CHANNEL NAME 715 | BANDWIDTH 720 |
|---|---|---|---|
| EKRGMDELDL4 | 8 | BLACKBELT TV | 5 |
| ... | ... | ... | ... |

Fig. 7

| OLT ID 805 | SHELF NO. 810 | NUMBER OF ONTs 815 | NUMBER OF STBs 820 | MULTICAST BANDWIDTH 825 | UNICAST BANDWIDTH 830 |
|---|---|---|---|---|---|
| EKRGMDELDL4 | 3 | 493 | 1553 | 45 | 70 |
| ... | ... | ... | ... | ... | ... |

PROGRAM MODELING TOOL

BACKGROUND

Program service providers, such as television service providers, deliver programs to their customers using different types of channels (e.g., Internet Protocol Television (IPTV) channels, Quadrature Amplitude Modulation (QAM) channels, etc.). Managing the assignment of programs to channels, in view of, among other things, available network resources, optimization considerations, and channel requirements, can cause program service providers to expend countless man hours.

DETAILED DESCRIPTION

The following detailed description refers to the accompanying drawings. The same reference numbers in different drawings may identify the same or similar elements.

According to an exemplary embodiment, a program modeling tool acquires, from a database, viewing data. For example, the viewing data pertains to Quadrature Amplitude Modulation (QAM) channels and Internet Protocol Television (IPTV) channels that are delivered to customers via a program delivery network. According to an exemplary embodiment, the viewing data is based on data obtained from set top boxes. For example, the viewing data is tuning data pertaining to tuners of set top boxes.

According to an exemplary embodiment, the program modeling tool acquires, from a database, network configuration data pertaining to the program delivery network. For example, the network configuration data includes topology data. According to an exemplary embodiment, the program modeling tool correlates topology data to the viewing data. For example, the program modeling tool is able to trace channel paths within the program delivery network based on the topology data and the viewing data correlation. By way of further example, assume the program delivery network is implemented to include an optical network. According to such an implementation, the program modeling tool maps the viewing data from set top boxes to other customer premises equipment (e.g., optical network termination devices, a media server devices, etc.) to backend network devices (e.g., optical line termination devices, router devices, video serving offices (VSOs), video home offices (VHOs), etc.). The mapping of devices (e.g., both customer premises and backend) provides a channel path for every channel delivery instance.

According to an exemplary embodiment, the program modeling tool calculates peak channel usage. The peak channel usage pertains to a set of channels being modeled. For example, the program modeling tool determines the peak time for the modeled channels. Stated differently, the program modeling tool determines a time period in which the number of set top boxes tuned to the modeled channels is at its maximum.

According to an exemplary embodiment, the program modeling tool generates reports based on peak channel usage data. For example, a report may include information that identifies channels being viewed during a peak period, the number of set top boxes or tuners tuned to each channel, the total number of channels viewed, and the bandwidth consumed. The program modeling tool generates a report pertaining to peak channel usage data based on user criteria. For example, a user may request that the program modeling tool generate a report as to the number of set top boxes (or tuners) tuned to each channel, per network device (e.g., per OLT backplane, per OLT shelf, per OLT, per VHO, etc.), during a specified time interval and for a set of channels (e.g., one or multiple channels). The user may also specify a group of set top boxes (e.g., one or multiple set top boxes). According to another example, the user may select that a specified, randomly selected percentage of set top boxes (or tuners) served by an OLT device be considered for a report, rather than all of the set top boxes (or tuners) served by the OLT device.

According to an exemplary embodiment, the program modeling tool calculates and reports the bandwidth usage for channels (e.g., IPTV channels, etc.) viewed during a specified time interval per network device (e.g., per OLT backplane, per OLT shelf, per gateway router (GWR), etc.). According to an exemplary embodiment, the program modeling tool converts channel name designations between the database that stores viewing data and the program modeling tool. According to an exemplary embodiment, the program modeling tool includes user interfaces to allow a user to interact with the program modeling tool.

According to an exemplary embodiment, the program modeling tool simulates moving a set of channels based on the viewing data and the network configuration data. For example, the program modeling tool models moving a set of channels delivered as QAM channels to channels being delivered as IPTV channels. According to an exemplary embodiment, the program modeling tool simulates adding a set of channels based on the viewing data and the network configuration data. For example, the program modeling tool models adding a set of channels to an existing channel lineup.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

Figure 1:
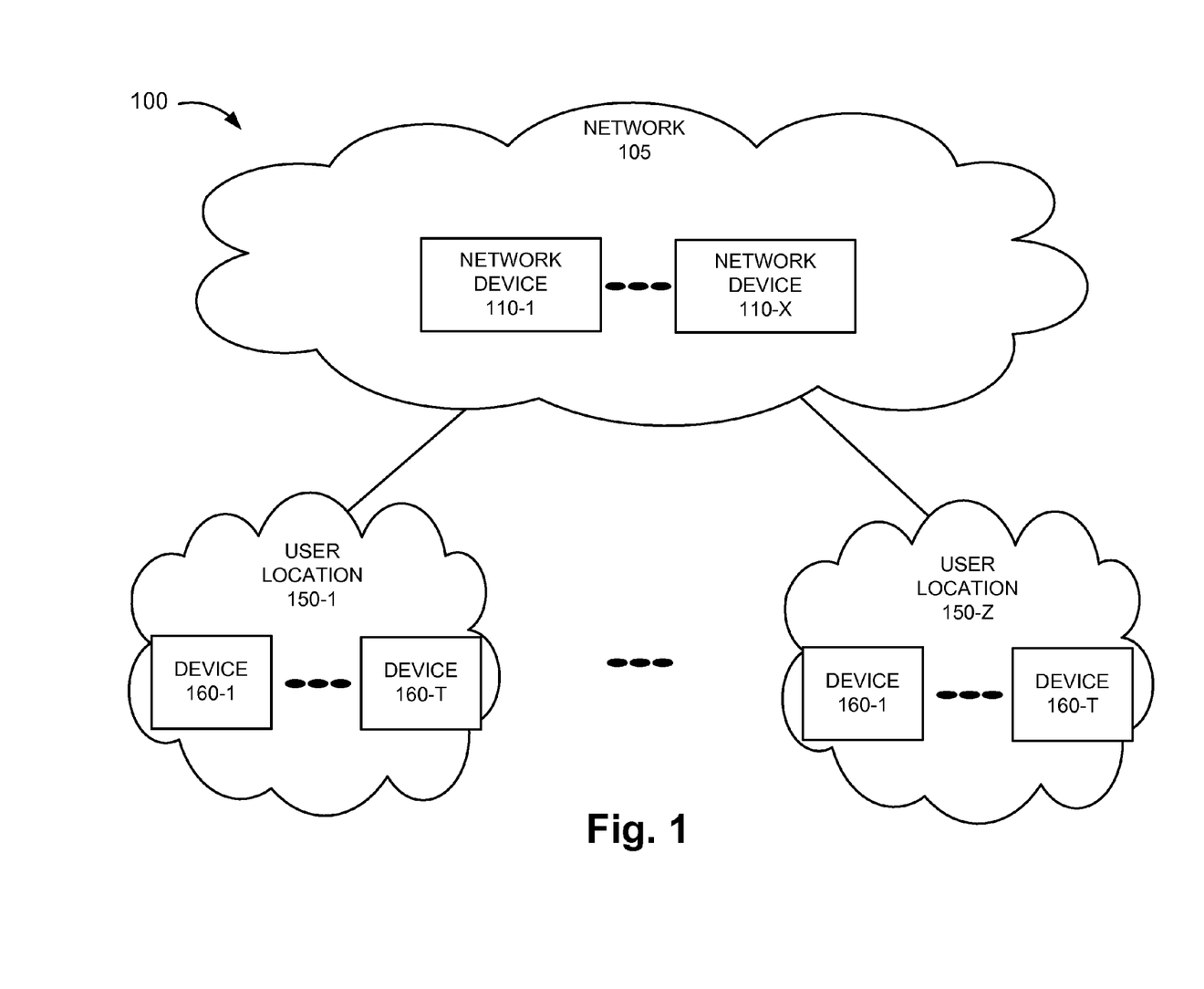
FIG. 1 is a diagram illustrating an exemplary environment in which exemplary embodiments may be implemented.

FIG. 1 is a diagram illustrating an exemplary environment 100 in which exemplary embodiments may be implemented. As illustrated, environment 100 includes a network 105. Network 105 includes network devices 110-1 through 110-X, in which X>1 (also referred to collectively as network devices 110 or individually as network device 110). Environment 100 also includes user locations 150-1 through 150-Z, in which Z>1 (also referred to collectively as user locations 150 or individually as user location 150). Each user location 150 includes devices 160-1 through 160-T, in which T>1 (also referred to collectively as devices 160 or individually as device 160).

Environment 100 may be implemented to include wired, optical, and/or wireless connections among the devices and network illustrated. A connection may be direct or indirect and may involve intermediary device(s) and/or network(s) not illustrated in FIG. 1. Additionally, the number and the arrangement of connections between the devices and the network are exemplary.

The number of devices and networks, and the configuration in environment 100 are exemplary. According to other embodiments, environment 100 may include additional devices, fewer devices, different devices, and/or differently arranged devices, than those illustrated in FIG. 1. Additionally, or alternatively, environment 100 may include an additional network and/or a differently arranged network, than that illustrated in FIG. 1.

A device may be implemented according to a centralized computing architecture, a distributed computing architecture, or a cloud computing architecture. Additionally, a device may be implemented according to one or multiple network architectures (e.g., a client device, a server device, a peer device, a proxy device, or a combination thereof).

Network 105 includes a network that provides programs to users. For example, network 105 includes a program delivery network. According to an exemplary implementation, the program delivery network provides programs to users that subscribe to a television service.

Network devices 110 include network devices that are capable of performing processes, as described herein. For example, a portion of network devices 110 is capable of delivering programs to users via devices 160 of user locations 150. For example, this portion of network devices 110 may be implemented to delivery programs using various technologies, such as an optical architecture, a coaxial cable architecture, an Internet Protocol (IP) TV architecture, a digital subscriber line (DSL) architecture, or some combination thereof. Depending on the architecture implemented, this portion of network devices 110 may include various types of program distribution devices, program storing devices, and other types of device that contribute to a program service, such as, super headend (SHE) devices, video hub office (VHO) devices, video serving office (VSO) devices, routers, gateway devices, program server devices, interactive programming guide devices, load balancer devices, optical network termination (ONT) devices, switching devices, splitter devices, passive optical network (PON) devices, etc.

A portion of network devices 110 is capable of acquiring viewing data. For example, the viewing data indicates channels viewed by users via devices 160. For example, this portion of network devices 110 may be implemented as a database management system.

A portion of network devices 110 stores network configuration data. For example, network configuration data includes topology data pertaining to network devices 110 of network 105 that deliver programs to user locations 150, links, etc. Network configuration data also includes topology data pertaining to devices 160, links to network 105, etc. Network configuration data may include other types of information pertaining to the delivery of channels (e.g., bandwidth requirements, etc.). By way of example, this portion of network devices 110 may be implemented as a database management system.

According to an exemplary embodiment, a portion of network devices 110 includes a program modeling tool. According to an exemplary embodiment, the program modeling tool uses viewing data and network configuration data to model the impact of adding channels or moving channels from one delivery type to another delivery type. For example, for a program delivery network that delivers programs to users as IPTV channels and as another type of channel (e.g., QAM channels, etc.), the program modeling tool models the impact of adding channels (e.g., IPTV, QAM, etc.) to the existing program channel lineup and/or moving channels from, for example, QAM to IPTV, or vice versa. By way of example, this portion of network devices 110 may be implemented as one or multiple computers. According to another exemplary embodiment, the program modeling tool may be implemented, wholly or partially, on a user device. For example, the program modeling tool may be implemented on a desktop computer, etc.

User location 150 is a location of a user(s). For example, user location 150 may be a residence, a place of business, etc. Devices 160 include devices that interface with network 105 and/or provides (e.g., displays) programs to users. For example, devices 160 may include a television, a set top box, a server device (e.g., a media server), a mobile device, an optical network termination device, a router, a computer, or other type of end user device.

Figure 2:
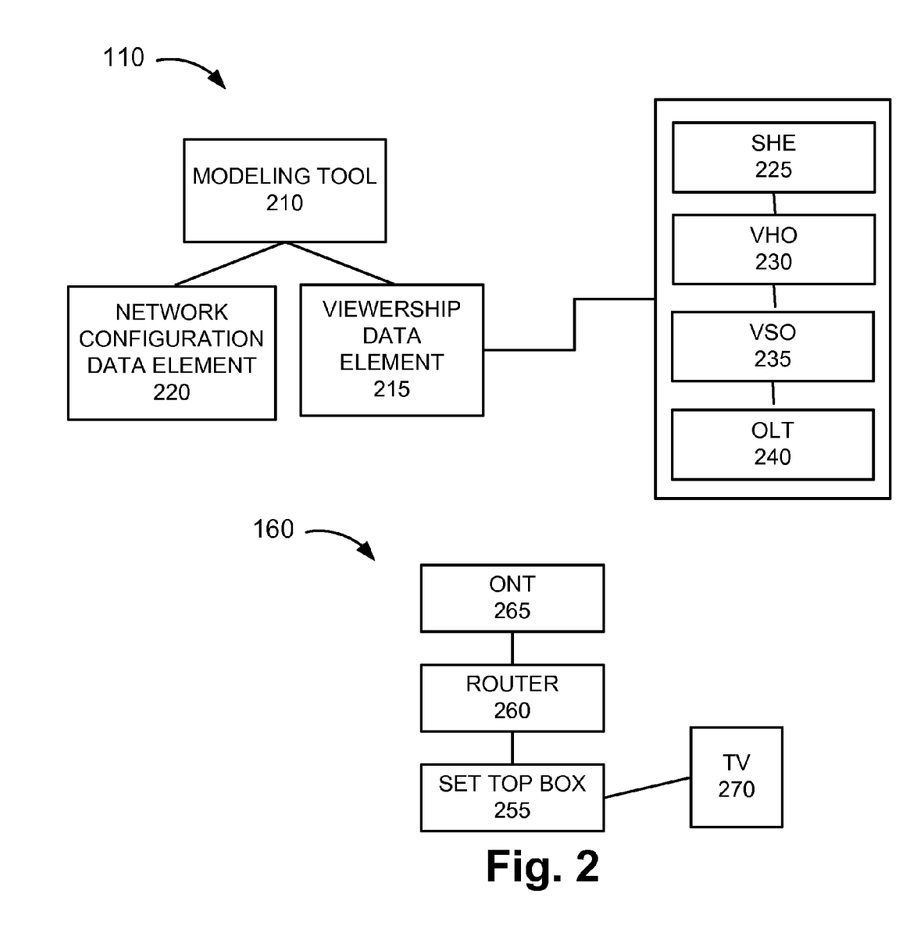
FIG. 2 is a diagram illustrating exemplary network elements and exemplary end user devices of FIG. 1.

FIG. 2 is a diagram illustrating exemplary network elements of network devices 110 and exemplary end user elements of devices 160. As illustrated network devices 110 include a modeling tool 210, a viewership data element 215, a network configuration data element 220, a SHE 225, a VHO 230, a VSO 235, and an OLT 240. Additionally, as illustrated, devices 160 include a set top box 255, a router 260, an ONT 265, and a television (TV) 270.

The number of network elements, end user elements, and the configuration are exemplary. According to other embodiments, network devices 110 may include additional network elements, fewer network elements, different network elements, and/or differently arranged network elements, than those illustrated in FIG. 2. For example, network devices 110 may include network elements that provide other types of services or functions, such as Internet service, video streaming service, mobile service, or alternatively access to one or more of these various services or functions. Additionally, or alternatively, network devices 110 may include other types of program delivery infrastructures, which may not include one or more of OLT 240, etc., depending on the program delivery system. Network devices 110 may include network elements not specifically illustrated, such as switches, amplifiers, add/drop multiplexers, other types of intermediary network elements, etc. For example, VSO 235 may include gateway routers (GWRs), etc.

According to other embodiments, devices 160 may include additional end user elements, fewer end user elements, different end user elements, and/or differently arranged end user elements, than those illustrated in FIG. 2. For example, devices 160 may include a computer, a mobile device, a media server, a network interface element, etc. Additionally, or alternatively, devices 160 may not include one or more of ONT 265, etc., depending on the architecture implemented within user location 150.

Also, according to other embodiments, one or more functions and/or processes described as being performed by a particular network element may be performed by a different network element, or some combination of network elements, which may or may not include the particular network element.

According to other embodiments, a single network element depicted in FIG. 2 may be implemented as multiple network elements. Conversely, multiple network elements depicted in FIG. 2 may be implemented as a single network element.

According to an exemplary embodiment, modeling tool 210 includes a network element that analyzes viewing data to identify peak viewership of a set of channels (e.g., one channel or multiple channels). For example, peak viewership includes a time period when the greatest number of set top boxes 255 is tuned to a set of channels to be modeled. The peak viewership may pertain to a geographical area of customer viewership (e.g., a state, zip code, etc.), one or multiple network elements (e.g., VSO 235, VHO 230, OLT 240, etc.) of a program delivery network, or other criterion.

According to an exemplary embodiment, modeling tool 210 uses viewing data and network configuration data to trace network resource utilization relating to viewing data. For example, when set top box 255 connects to network elements (e.g., OLT 240, VSO 235, etc.) to receive programs, the network elements used may be substantially a constant. That is, for each connection, for example, set top box 255 connects to the same shelf of OLT 240, the same network element in VSO 235, etc. Based on this implementation, modeling tool 210 identifies which network elements were used to provide a channel to a set of set top boxes 255. For example, modeling tool 210 may trace back to each network element (e.g., OLT 240), a sub-network element (e.g., a shelf of OLT 240, etc.), a distribution site (e.g., VSO 235, VHO 230), a network element of a distribution site (e.g., a GWR of VSO 235), etc.

According to an exemplary embodiment, modeling tool 210 models moving a set of channels delivered according to one channel type to having the set of channels delivered according to another channel type. For example, modeling tool 210 models the moving of programs delivered on a QAM channel to an IPTV channel or vice versa. According to an exemplary embodiment, modeling tool 210 models the impact across a network element, a sub-network element (e.g., shelf, backplane), a distribution site, a network element of a distribution site, an end user element (e.g., ONT 265, etc.), a portion of the program delivery network, or the entire program delivery network. According to an exemplary embodiment, modeling tool 210 models adding (new) channels. For example, modeling tool 210 models adding a QAM channel, an IPTV channel, etc., to an existing channel line-up.

According to an exemplary embodiment, modeling tool 210 generates usage reports. By way of example, modeling tool 210 may generate a report that indicates the number of set top boxes 255 or the number of tuners within set top boxes 255 that are tuned to each QAM channel and IPTV channel on a per ONT 265 basis; on a per OLT 240 backplane basis; on a per OLT 240 shelf basis; on a per OLT 240 basis; on a per VSO 235 basis; on a per VHO 230 basis; and on a network-wide scale basis. The report may include other information, such as date/day/time, sample period(s), specified channel or set of channels, etc.

According to an exemplary embodiment, modeling tool 210 may sort a report based on various parameters, such as, for example, set top box 255 usage, or set top box tuner usage, by a set of channels, date/day/time, sample time period, network device, etc. For example, modeling tool 210 may generate reports that are sorted by ONTs 265 per OLT 240 (e.g., backplane level); ONTs 265 per OLT 240 (e.g., on a shelf level); shelves per OLT 240, by GWR, by VSO 235, or by VHO 230; OLTs 240 per GWR, by VSO 235, by VHO 230; GWRs per VSO 235 or VHO 230; VSOs per VHO 230; or by VHOs 230 as these reports correlate to set top boxes 255 or set top box tuner usages. By way of further example, a report for OLTs 240 per VHO 230 may list, in order of highest channel viewing usage during a specified time interval and a set of channels, all of the OLTs 240 associated with a particular VHO 230, etc.

According to an exemplary embodiment, modeling tool 210 provides various user interfaces to allow a user to interact with modeling tool 210. For example, a user may input peak viewership parameters via a user interface. By way of example, the peak viewership parameters may include the set of channels for which modeling tool 210 calculates peak viewership, the geographic area or selection of elements for which modeling tool 210 calculates peak viewership, and time parameters (e.g., date/time interval) pertaining to the viewing data to be used. Additionally, for example, a user may input modeling parameters via a user interface. For example, the modeling parameters may indicate whether modeling tool 210 is adding a new set of channels, the type of channels being newly added, moving a set of channels, the type of channels being moved, channel identifiers indicating the channels being moved, bandwidth requirements for a channel, etc. A user may input parameters pertaining to the generation of reports via a user interface. For example, a user may request, via a user interface, for modeling tool 210 to select a subset of set top boxes 255 for which to generate a report or select a percentage of set top boxes 255 served by OLT 240 be used for generating a report. Modeling tool 210 is described further below.

Viewership data element 215 includes a network element that manages and stores user viewership data. For example, the user viewership data includes set top box 225 tuning data for QAM and IPTV channels. By way of further example, user viewership data may include a device identifier (e.g., a network address, a serial number, an equipment identifier, etc.) pertaining to set top box 225. The user viewership data may also include, for example, time data (e.g., start date/day/time and stop date/day/time of tuning) and, a channel identifier (e.g., channel number, channel name) and/or a program identifier (e.g., program name, etc.). User viewership data may also include other types of data, such as, attributes of the program (e.g., high-definition, standard definition, 3-D, etc.) tuned to and type of channel (e.g., QAM, IPTV, etc.). The user viewership data may include data that is collected over multiple sampled time periods.

Network configuration data element 220 includes a network element that manages and stores network configuration data. For example, the network configuration data identifies devices/network elements associated with the program delivery system, such as SHE 225, VHO 230, VSO 235, OLT 240, and end user devices, such as, ONT 265, router 260 and set top box 255, the links between the devices/network elements, etc., available bandwidth, etc. Additionally, network configuration data may include links on a sub-device/network element level. By way of example, network configuration data may indicate, on a shelf or a backplane level of OLT 240, a connection between OLT 240 and set top box 255.

SHE 225, VHO 230, VSO 235, and OLT 240 include network elements of a conventional program delivery system. By way of example, SHE 225 includes network elements that ingest programs on a national level. SHE 225 may aggregate, process, encode, and distribute programs to VHO 230. Additionally, for example, VHO 230 includes network elements that ingest programs on a regional and local level. VHO 230 may also provide on-demand services, etc. VSO 235 distributes programs to user locations 150 via access networks. OLT 240 serves as the program service provider's endpoint. OLT 240 may provide downstream and upstream frame processing, etc.

Set top box 255 includes an end user element, such as a converter box, a television receiver, a tuner device, a digibox device, an Internet Protocol (IP) set top box, an IPTV set top box, and/or some other form of a set top box. Router 260 includes an end user element, such as an in-home router device, a broadband router, or a wireless router. ONT 265 includes an end user element of a conventional ONT. Television 270 includes an end user element, such as a television or a smart television.

Figure 3:
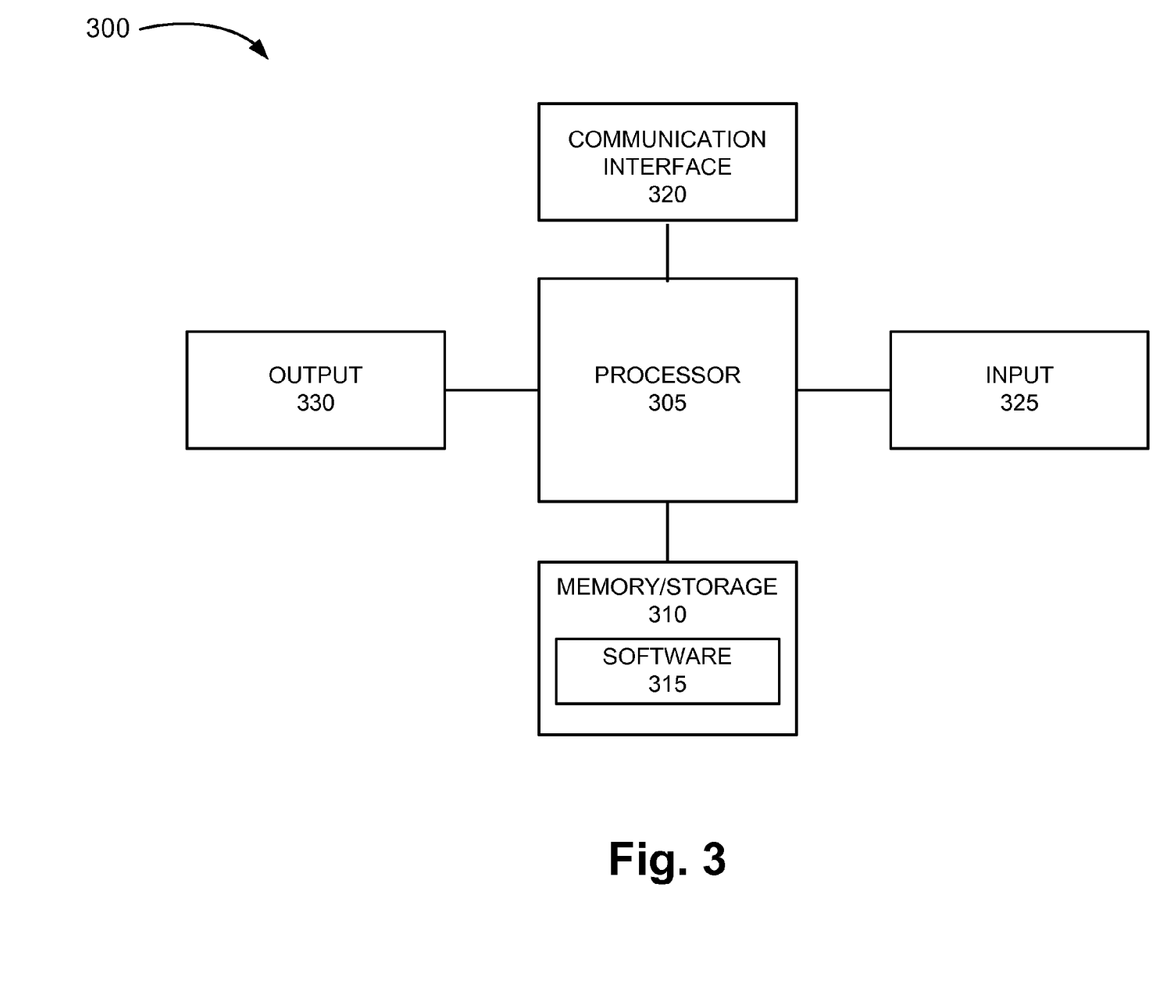
FIG. 3 is a diagram illustrating exemplary components of a device that may correspond to one or more of the devices previously depicted.

FIG. 3 is a diagram illustrating exemplary components of a device 300 that may correspond to one or more of the devices depicted in the previous Figures. As illustrated, according to an exemplary embodiment, device 300 includes a processor 305, memory/storage 310, software 315, a communication interface 320, an input 325, and an output 330. According to other embodiments, device 300 may include fewer components, additional components, different components, and/or a different arrangement of components than those illustrated in FIG. 3 and described herein.

Processor 305 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 may include one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 may include an application or a program that provides a function and/or a process. Software 315 may include firmware. For example, modeling tool 210 may be implemented using one or more program(s) and/or application(s). Additionally, for example, one or more program(s) and/or application(s) may be used to display user interfaces, communicate with other devices, etc. Also, for example, other devices may be implemented with software 315 to provide a function and/or a process described herein.

Communication interface 320 may permit device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 may permit an output from device 300. For example, output 330 may include a speaker, a display, a touchscreen, a touchless screen, a light, an output port, and/or some other type of visual, auditory, tactile, etc., output component.

Device 300 may perform processes and/or functions, as described herein, in response to processor 305 executing software 315 stored by memory/storage 310. By way of example, instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.).

As previously described, modeling tool 210 allows a user to model a program delivery network or portion thereof when moving a set of channels. Modeling tool 210 provides user interfaces to allow the user to interact with modeling tool 210. By way of example, assume for description purposes, that a user wishes to model a set of QAM channels to be delivered as a set of IPTV channels. Also assume that the user selects a VHO 230 (e.g., located in the state of Maryland) to which the modeling pertains.

Figure 4:
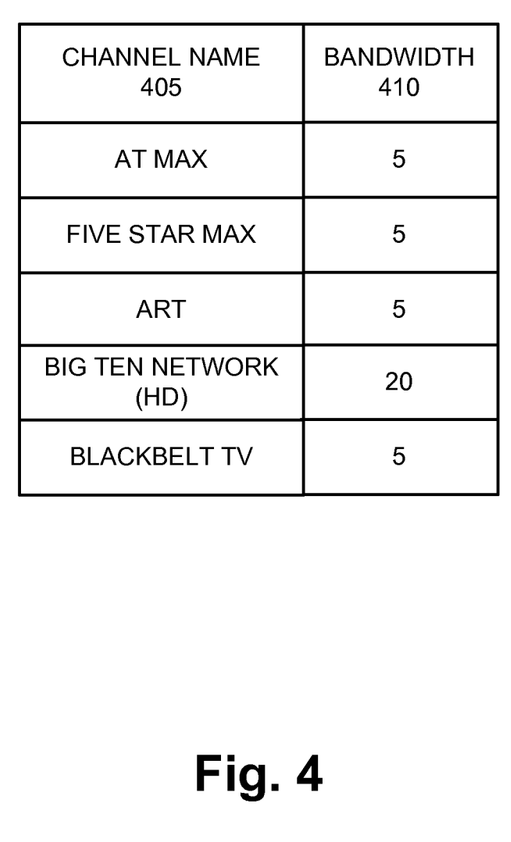
FIG. 4 is a diagram illustrating exemplary channel information.

According to an exemplary process, the user inputs peak viewership parameters into modeling tool 210. For example, the peak viewership parameters include channel identifiers pertaining to a set of channels to be modeled. By way of example, the user may select, via a user interface, a set of channel numbers, a set of channel names, or other suitable channel identifier. FIG. 4 is a diagram illustrating exemplary channel information. As illustrated, the channel information includes a channel name 405 and bandwidth 410. Bandwidth 410 indicates the user's assumption for bandwidth of a particular channel. Bandwidth information (e.g., megabits/second, etc.) may be selected by the user or this information may be a preset in view of the type of channel (e.g., high-definition, standard definition, etc.) and/or the way the channel is delivered (e.g., IPTV channel, QAM channel, etc.).

The user may also select a geographic area (e.g., a multi-state region, a country-wide region, a Zip code, etc.) for calculating peak viewership. Additionally, or alternatively, the user may select one or multiple network devices 110 for calculating peak viewership. For example, the user may select a VHO 230, an OLT 240, a VSO 235, etc.

The user may input other peak viewership parameters pertaining to the viewing data. For example, the user may input a time period (e.g., a start day and time and an end day and time) regarding the viewing data to be used by modeling tool 210 to calculate peak channel usage data. Additionally, the user may input other peak viewership parameters pertaining to how peak usage is calculated by modeling tool 210. For example, modeling tool 210 may filter viewing data to discard viewing data of a channel that is momentary over time (e.g., due to channel surfing, etc.). According to other implementations, modeling tool 210 may use additional, fewer, and/or different peak viewership parameters than those described.

Figure 5:
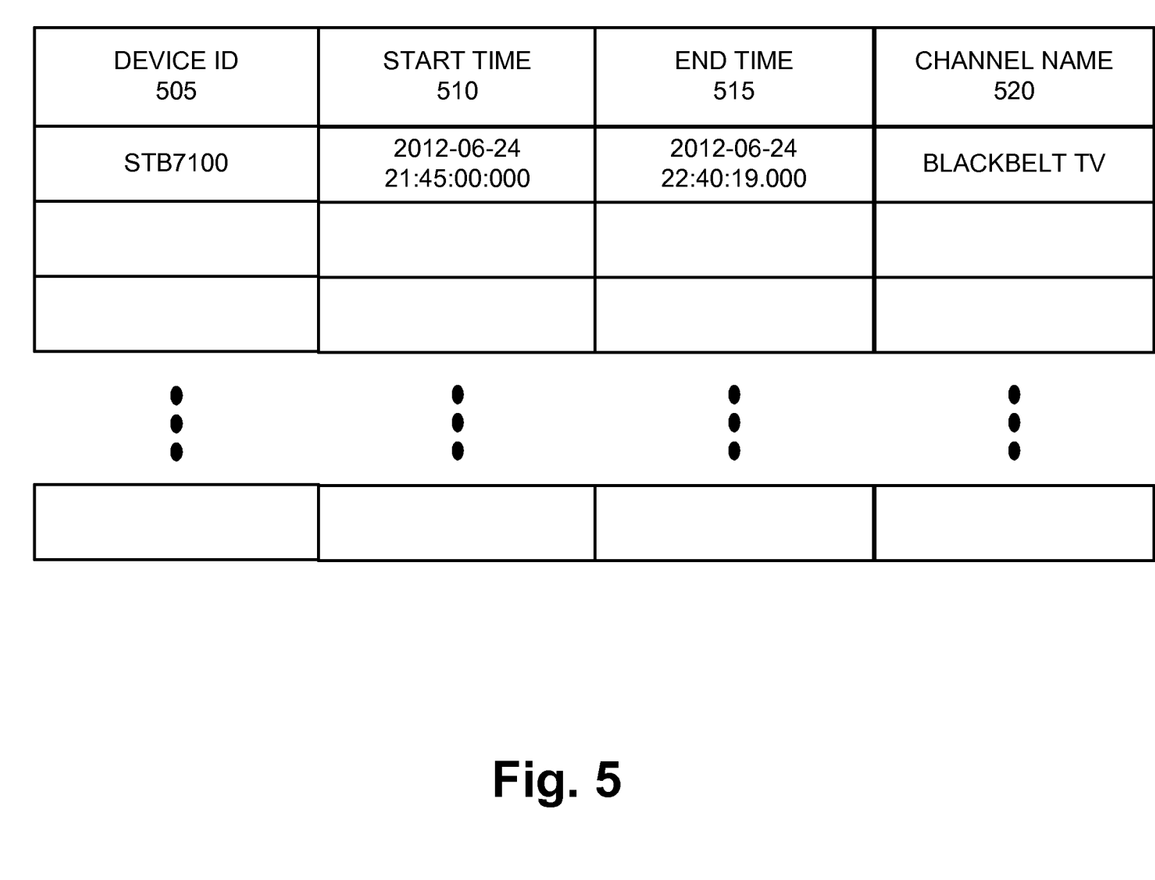
FIG. 5 is a diagram illustrating exemplary viewing data.

Modeling tool 210 calculates peak viewership for the set of channels based on the peak viewership parameters. For example, modeling tool 210 queries viewership data element 215, which stores viewing data, based on the peak viewership parameters. According to this example, modeling tool 210 queries viewing data pertaining to, among other peak viewership parameters, the channel information. FIG. 5 is a diagram illustrating exemplary viewing data. As illustrated, the viewing data includes a device identifier 505, a start time 510, an end time 515, and a channel name 520. According to other implementations, the viewing data may include additional, fewer, and/or different information.

Modeling tool 210 calculates the peak time for the modeled channels. For example, modeling tool 210 analyzes the viewing data resulting from the query and identifies a peak viewership. The peak viewership represents a highest number of set top boxes 255 tuned to the modeled channels during a time period.

Based on this analysis, modeling tool 210 generates peak channel usage data. For example, the peak channel usage data includes unique identifiers that identify each set top box 255 and the channel name that was tuned to during the peak time. The bandwidth for each channel may also be included in the peak channel usage data. According to other implementations, the peak channel usage data may include additional, fewer, and/or different information.

Modeling tool 210 uses the peak channel usage data to query the network configuration data stored by network configuration data element 220. For example, a set top box identifier is used to query the topology data and acquire channel path information for every channel delivery instance to set top box 255. As previously described, according to an exemplary implementation, assume the program delivery network is implemented as an optical network. According to such an implementation, the modeling tool 210 maps the peak channel usage data from set top box 255 to other customer premises equipment (e.g., optical network termination devices, a media server devices, etc.) to backend network devices (e.g., optical line termination devices, router devices, video serving offices (VSOs), video home offices (VHOs), etc.).

Figure 6:
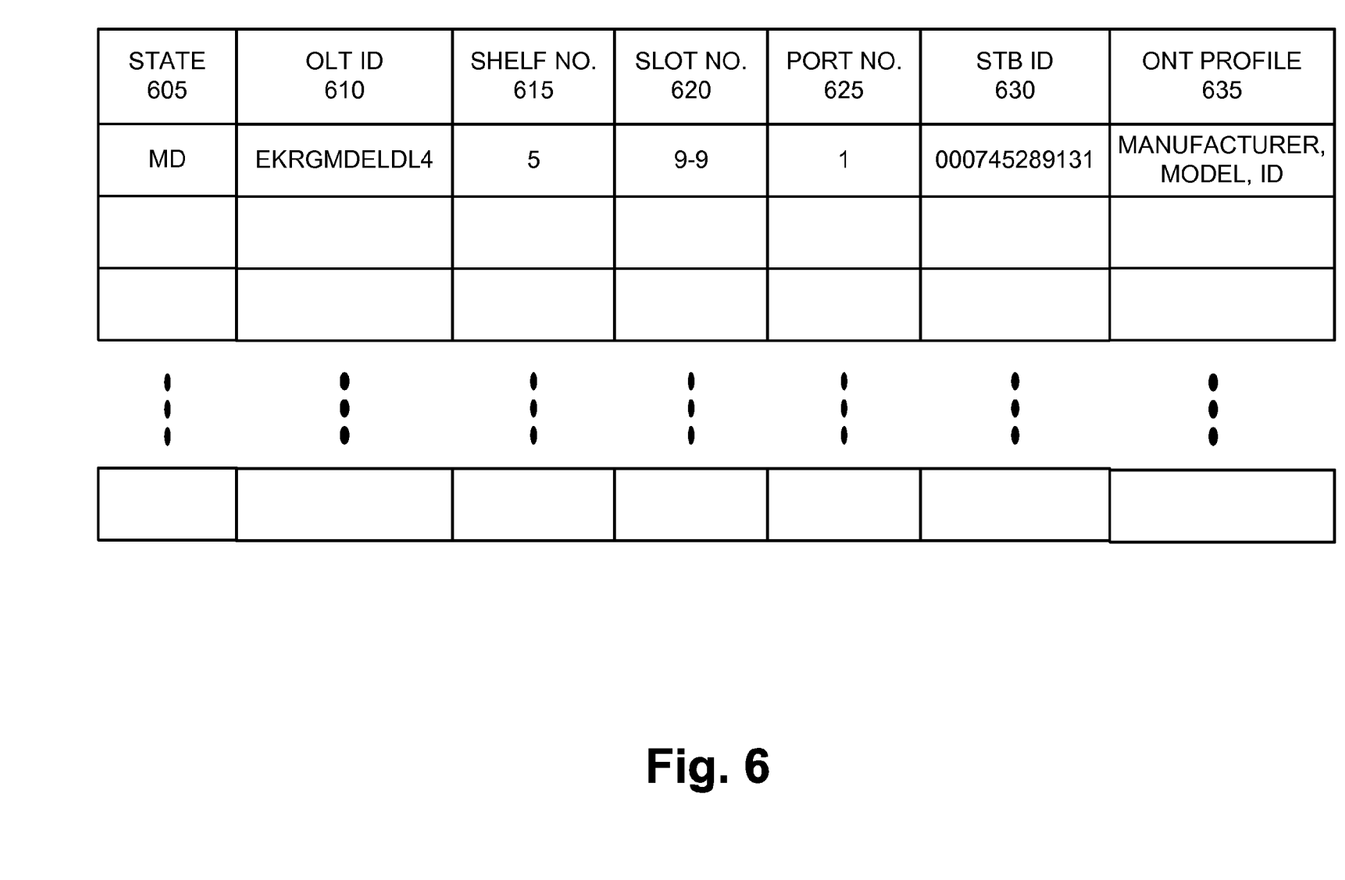
FIG. 6 is a diagram illustrating exemplary channel path information.

FIG. 6 is a diagram illustrating exemplary channel path information. The channel path information includes information pertaining to a connection path to which the modeled channels are delivered to set top boxes 255 from VHO 230 under analysis. As illustrated, the path information includes a state 605, an OLT identifier 610, a shelf number 615, a slot number 620, a port number 625, a set top box identifier 630, and an ONT profile 635. State 605 indicates a geographic area (e.g., MD or Maryland pertaining to VHO 230), OLT ID 610 indicates an identifier of OLT 240, shelf number 615 indicates a shelf of OLT 240, slot number 620 indicates a slot number of OLT 240, port number 625 indicates a port number of OLT 240, set top box identifier 630 indicates the unique identifier of set top box 255, and ONT profile 635 indicates various information pertaining to ONT 265, such as manufacturer, model number, serial number, etc. According to other implementations, the channel path information may include additional, fewer, and/or different information.

Figure 7:
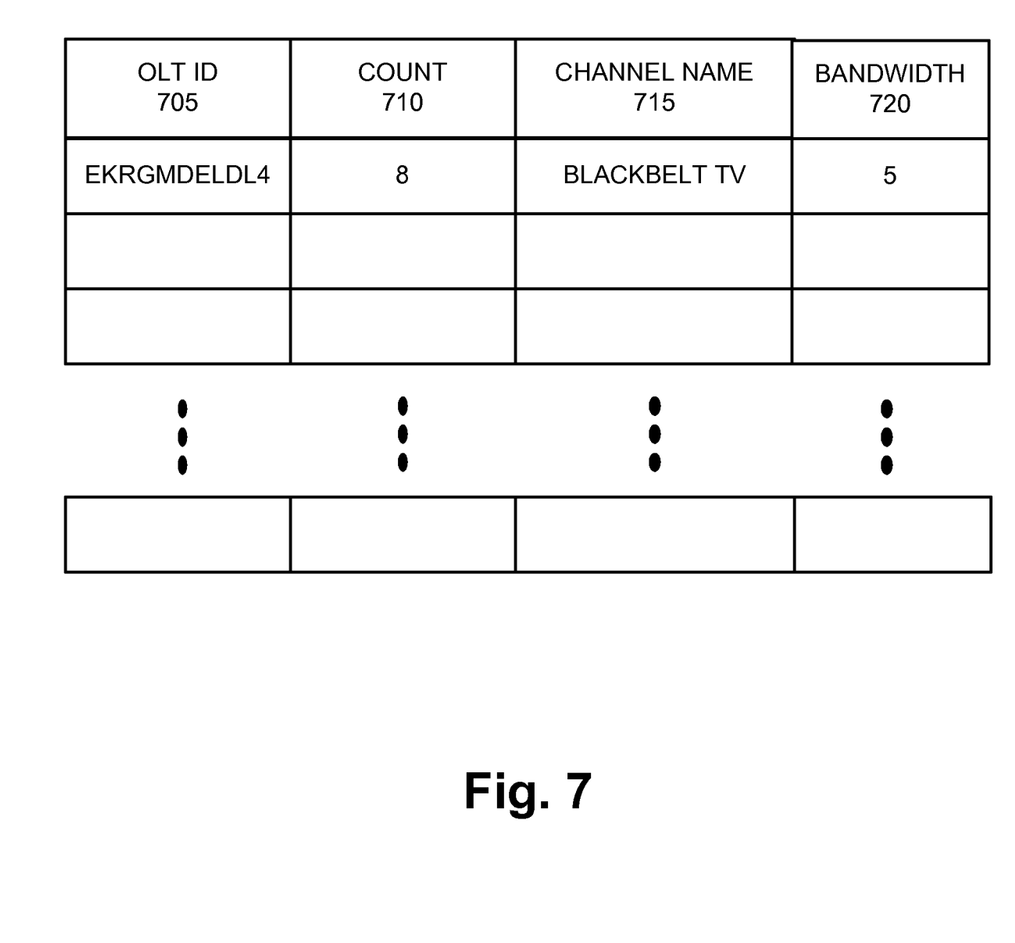
FIG. 7 is a diagram illustrating exemplary peak channel delivery data.

Modeling tool 210 joins the channel path information with the peak channel usage information to generate peak channel delivery data. FIG. 7 is a diagram illustrating exemplary peak channel delivery data. As illustrated, the peak channel delivery data includes an OLT ID 705, a count 710, a channel name 715, and a bandwidth 720. OLT ID 705 identifies OLT 240, count 710 indicates the number of unique set top boxes 255 joined to a channel, channel name 715 indicates the name of a channel, and bandwidth 720 indicates the modeled bandwidth for the channel as input by the user. According to other implementations, the peak channel delivery data may include additional, fewer, and/or different data. According to an exemplary implementation, modeling tool 210 joins the channel path information with the peak channel usage information based on the unique set top box identifiers. Modeling tool 210 aggregates bandwidth (e.g., multicast, unicast) using the peak channel delivery data, as described further below. For example, modeling tool 210 aggregates bandwidth based on OLT identifiers of OLTs 240 or identifiers of sub-components (e.g., shelves, backplanes, etc.).

As previously described, according to this example, modeling tool 210 is modeling a set of QAM channels to be delivered as a set of IPTV channels. For the delivery of an IPTV channel, the program delivery network may use multicasting and/or unicasting depending on the network paths needed to reach each of the set top boxes 255. For example, the program delivery network may transmit one copy of the IPTV channel over the segments of a network path that are shared by multiple set top boxes 255. The program delivery network creates additional copies of the IPTV channel to transmit over other segments of the network path that diverge from the segments so as to reach set top boxes 255. Modeling tool 210 stores data indicating the amount of bandwidth used by an IPTV channel. Modeling tool 210 may also store other information pertaining to resource utilization. For example, some OLTs 240 may include backplanes that are resource-limited.

According to this exemplary scenario, modeling tool 210 applies an algorithm to the peak channel delivery data. The algorithm uses aggregation techniques to sum the multicast bandwidth at OLTs 240 (including shelves and backplanes levels). The algorithm also counts the number of set top boxes 255 per OLT shelf or per OLT backplane in order to derive unicast bandwidth requirements. The unicast bandwidth is the sum of the bandwidth of each program a set top box 255 was tuned to for each OLT 240.

Figure 8A:
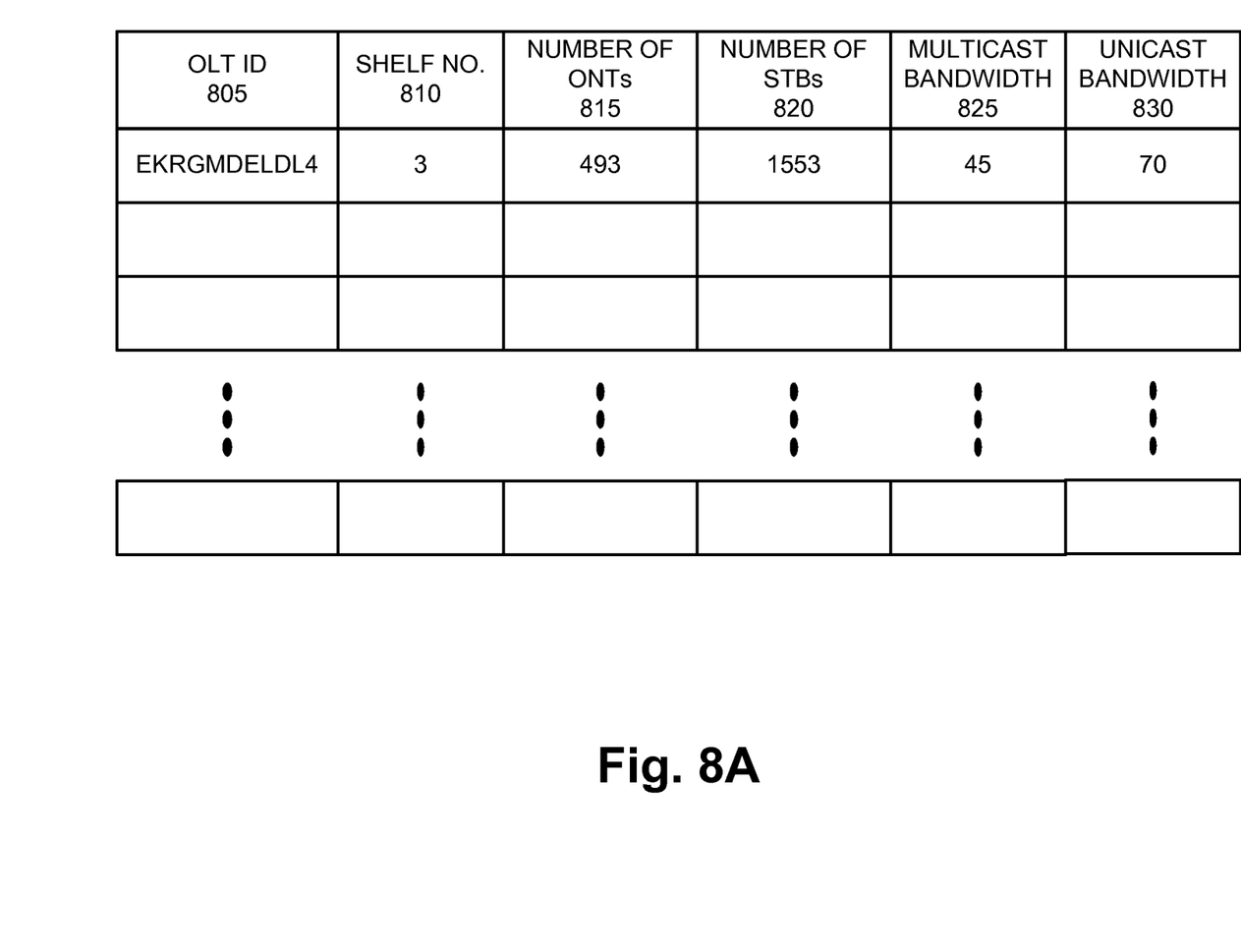
FIGS. 8A and 8B are diagrams illustrating exemplary modeling information.
Figure 8B:
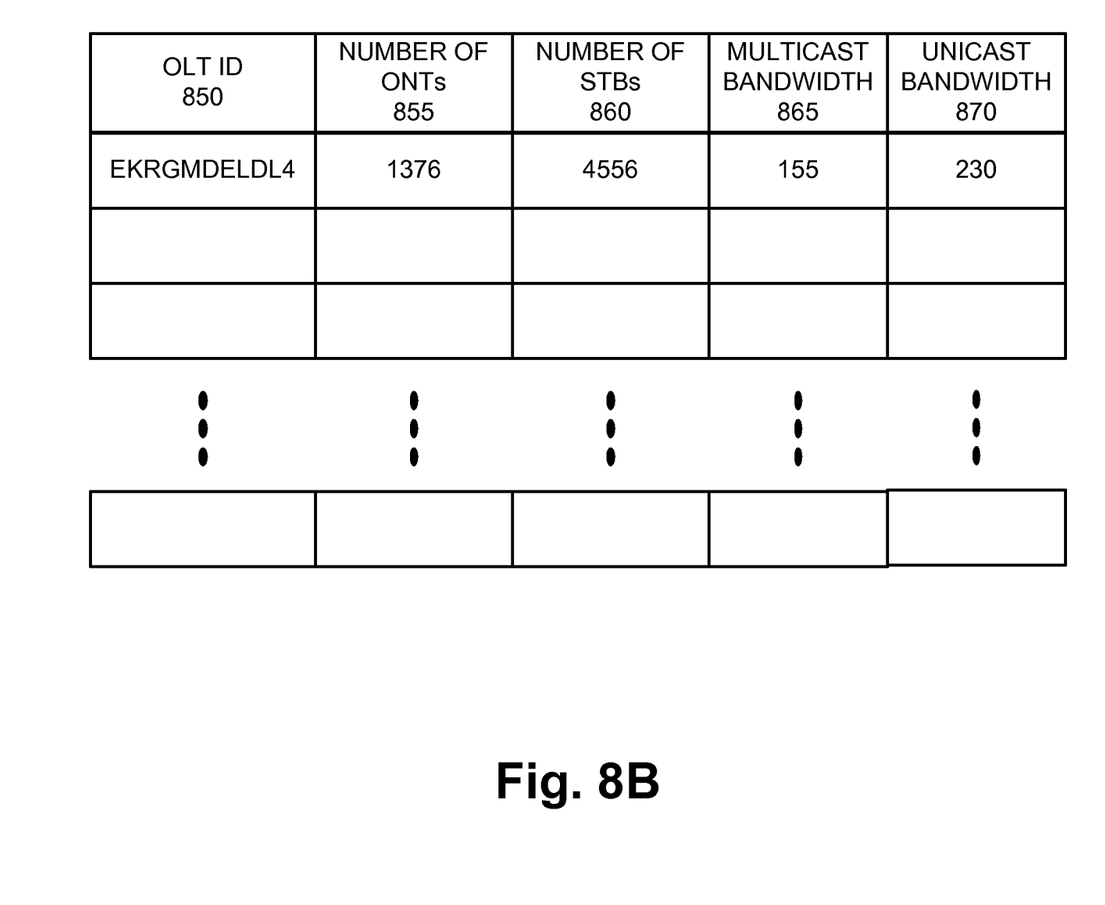

FIGS. 8A and 8B are diagrams illustrating exemplary modeling information. The modeling information includes information pertaining to the delivery of the modeled channels as IPTV channels.

FIG. 8A illustrates modeling information pertaining to VSO 235. The modeling information includes bandwidth requirements above a user-supplied threshold. Referring to FIG. 8A, OLT ID 805 identifies OLT 240, shelf number 810 identifies a shelf of OLT 240, number of ONTs 815 indicates the number of ONTs 265 used to deliver an IPTV channel, number of STBs 820 indicates the number of set top boxes 255 used to deliver the IPTV channel, multicast bandwidth 825 indicates the multicast bandwidth to deliver the IPTV channel to set top boxes 255, and unicast bandwidth 830 indicates the unicast bandwidth to deliver the IPTV channel to set top boxes 255. According to other implementations, the modeling information may include additional, fewer, and/or different information.

FIG. 8B illustrates modeling information pertaining to OLT 240. The modeling information includes bandwidth requirements above a user-supplied threshold. Referring to FIG. 8B, OLT ID 850 identifies OLT 240, number of ONTs 855 indicates the number of ONTs 265 used to deliver an IPTV channel, number of STBs 860 indicates the number of set top boxes 255 used to deliver IPTV channel, multicast bandwidth 865 indicates the multicast bandwidth to deliver the IPTV channel to set top boxes 255, and unicast bandwidth 870 indicates the unicast bandwidth to deliver the IPTV channel to set top boxes 255. According to other implementations, the modeling information may include additional, fewer, and/or different information.

Figure 9:
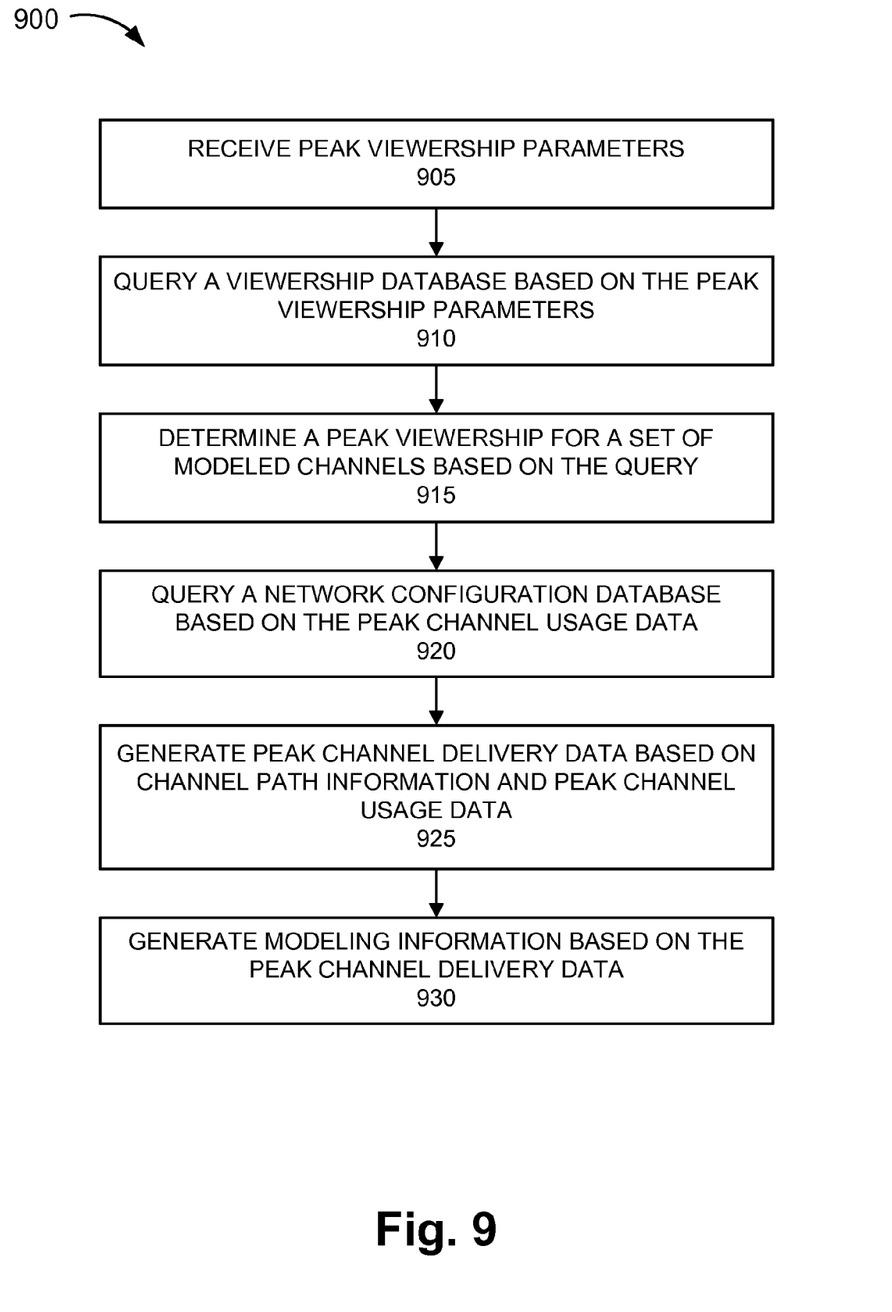
FIG. 9 is a flow diagram illustrating an exemplary process for modeling the moving of a set of channels according to an exemplary embodiment.

FIG. 9 is a flow diagram illustrating an exemplary process 900 for modeling the moving of a set of channels according to an exemplary embodiment. A step or an act described in process 900 is performed by modeling tool 210. For example, processor 305 may execute software 315 to perform the step or the act described.

Process 900 may begin with receiving peak viewership parameters (block 905). For example, modeling tool 210 provides user interfaces that allow a user to select or input peak viewership parameters. As previously described, according to an exemplary implementation, peak viewership parameters include the set of channels for which modeling tool 210 calculates peak viewership, a geographic area or one or multiple network elements of the program delivery network, and time parameters. The peak viewership parameters may also include modeling parameters. For example, the modeling parameters indicate whether the set of channels are being moved or newly added, the type of channels, channel identifiers, bandwidth requirements for a channel, etc.

In block 910, a viewership database is queried based on the peak viewership parameters received. For example, modeling tool 210 queries viewership data element 215 based on peak viewership parameters. According to an exemplary implementation, modeling tool 210 identifies viewership data pertaining to the modeled channels.

In block 915, a peak viewership for a set of modeled channels is determined based on the queried viewership database. For example, modeling tool 210 determines a peak time of viewership pertaining to the modeled channels based on the viewership data. As previously described, according to an exemplary implementation, the peak time represents a time period in which the number of set top boxes 255 tuned to the modeled channels is at its maximum. Modeling tool 210 obtains peak channel usage data based on the query.

In block 920, a network configuration database is queried based on the peak channel usage data. For example, modeling tool 210 queries network configuration data element 220 based on the peak channel usage data. According to an exemplary implementation, modeling tool 210 maps the peak channel usage data from set top box 255 to other customer premises equipment and to backend network devices to select the channel path pertaining to the delivery of a channel during the peak time. Modeling tool 210 obtains channel path information.

In block 925, peak channel delivery data is generated based on channel path information and the peak channel usage data. For example, modeling tool 210 performs a join operation to aggregate the channel path information with the peak channel usage data. As a result of the join operation, modeling tool 210 generates peak channel delivery data.

In block 930, modeling information is generated based on the peak channel delivery data. For example, modeling tool 210 simulates the delivery of the modeled channels based on the peak channel delivery data. For example, if the modeling tool 210 simulates the delivery of a set of QAM channels as IPTV channels, the modeling information includes bandwidth requirements resulting from such a simulated delivery. For example, modeling tool 210 calculates expected bandwidth requirements at OLT 240 and/or at other network elements.

Although FIG. 9 illustrates an exemplary process 900 to model the moving of a set of channels, process 900 may include additional operations, fewer operations, and/or different operations than those illustrated in FIG. 9 and described herein. For example, as previously described, modeling tool 210 may model the adding of channels to an existing channel lineup. The input list includes existing and any channels that will be added. Modeling tool 210 generates expected bandwidth requirements for the new IPTV channel lineup (existing+added channels).

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.) and/or a combination of hardware and software (e.g., software 315). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 310.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. For example, the load of the network (e.g., in terms of bandwidth usage, etc.) when simulating IP channels may correspond to the load during the peak usage time when the channels were delivered as QAM channels. For example, during the peak usage time, the bandwidth utilization may be obtained on the IP channel side of the network. Alternatively, the load of the network may be set to another initial state (e.g., no bandwidth usage, etc.) on which to simulate the IP channels.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
    receiving, by a modeling tool device, peak viewership parameters for modeling program channels with respect to an existing program channel line-up of programs delivered from a program delivery network to customer premises equipment (CPE) of subscribers according to a Quadrature Amplitude Modulation (QAM) delivery channel format;
    querying, by the modeling tool device, a device that stores viewership data based on the peak viewership parameters;
    determining, by the modeling tool device, a peak viewership for a plurality of program channels based on the querying of the device;
    querying, by the modeling tool device, another device that stores network configuration data pertaining to a set of backend network devices of the program delivery network based on peak viewership data obtained from the determining;
    obtaining, by the modeling tool device, channel path information for the plurality of program channels, based on a mapping of the set of backend network devices and a plurality of links to a set of CPE devices used to provide each program channel to a set top box;
    generating, by the modeling tool device, peak channel delivery data based on the channel path information and the peak viewership data; and
    simulating, by the modeling tool device and based on the peak channel delivery data, resource utilization across a portion of the program delivery network that includes a subset of the backend network devices and the CPE devices determined to be substantially a constant in each channel delivery instance for a particular program channel, including:
        bandwidth requirements associated with adding, to the existing program channel line-up, one or more other program channels provisioned for another program to be delivered according to the QAM delivery channel format, and
        multicast bandwidth requirements and unicast bandwidth requirements associated with moving one or more of the programs, delivered via a set of the plurality of program channels, from the existing program channel line-up, for delivery according to an Internet Protocol television (IPTV) delivery channel format, to another set of the program channels.

2. The method of claim 1, wherein the simulating comprises:
    deriving the unicast bandwidth requirements based on a number of set top boxes associated with the subscribers.

3. The method of claim 2, wherein the simulating further comprises:
    aggregating the multicast bandwidth requirements and the unicast bandwidth requirements.

4. The method of claim 1, wherein the querying of the device that stores viewership data comprises:
    identifying set top boxes tuned to one or more of the plurality of program channels during a peak viewership time period.

5. The method of claim 4, wherein the querying of the device that stores network configuration data comprises:
    identifying a network path used for delivering the one or more of the plurality of program channels to the identified set top boxes.

6. The method of claim 1, further comprising:
    generating one or more reports that include information pertaining to the resource utilization across the portion of the program delivery network based on the simulating.

7. The method of claim 1, wherein simulating the resource utilization includes determining whether multicasting and unicasting are needed for provisioning the other set of the program channels.

8. The method of claim 1, wherein the simulating comprises:
    simulating the resource utilization in relation to one or more user-designated, identified network devices in the at least a portion of the program delivery network, including at least one of:
        a network element,
        a sub-network element,
        a distribution site,
        a network element of a distribution site, or
        an end-user element.

9. A modeling device comprising:
    a communication interface;
    a memory that stores instructions; and
    a processor to execute the instructions to:
        receive peak viewership parameters for modeling program channels with respect to an existing program channel line-up of programs delivered from a program delivery network to customer premises equipment (CPE) of subscribers according to a Quadrature Amplitude Modulation (QAM) delivery channel format;
        query, via the communication interface, a device that stores viewership data based on the peak viewership parameters;
        determine a peak viewership for a plurality of program channels based on a response to a query of the device;
        query, via the communication interface, another device that stores network configuration data pertaining to a set of backend network devices of the program delivery network, based on peak viewership data obtained from a determination of the peak viewership;
        obtain channel path information for the plurality of program channels, based on a mapping of the set of backend network devices and a plurality of links to a set of CPE devices used to provide each program channel to a set top box;
        generate peak channel delivery data based on the channel path information and the peak viewership data; and simulate, based on the peak channel delivery data, resource utilization across a portion of the program delivery network that includes a subset of the backend network devices and the CPE devices determined to be substantially a constant in each channel delivery instance for a particular program channel, including:
bandwidth requirements associated with adding, to the existing program channel line-up, one or more other program channels provisioned for another program to be delivered according to the QAM delivery channel format, and
multicast bandwidth requirements and unicast bandwidth requirements associated with moving one or more of the programs, delivered via a set of the plurality of program channels, from the program channel line-up, for delivery according to an Internet Protocol television (IPTV) delivery channel format, to another set of the program channels.

10. The modeling device of claim 9, wherein the processor is to further execute the instructions to:
derive the unicast bandwidth requirements based on a number of set top boxes associated with the subscribers.

11. The modeling device of claim 10, wherein the processor is to further execute the instructions to:
aggregate the multicast bandwidth requirements and the unicast bandwidth requirements.

12. The modeling device of claim 9, wherein when querying the device, the processor to execute the instructions to:
identify set top boxes tuned to one or more of the plurality of program channels during a peak viewership time period.

13. The modeling device of claim 12, wherein when querying the other device, the processor to execute the instructions to:
identify a network path used for delivering the one or more of the plurality of program channels to the identified set top boxes.

14. The modeling device of claim 9, wherein the processor to execute the instructions to:
generate one or more reports that include information pertaining to the resource utilization across the portion of the program delivery network based on a simulation.

15. The modeling device of claim 9, wherein when simulating, the processor to execute the instructions to:
simulate the resource utilization in relation to one or more user-designated, identified network devices in the portion of the program delivery network, including at least one of:
a network element,
a sub-network element,
a distribution site,
a network element of a distribution site, or
an end-user element.

16. The modeling device of claim 9, wherein when simulating the resource utilization, the processor to execute the instructions to:
determine whether multicasting and unicasting are needed for provisioning the other set of the program channels.

17. A non-transitory storage medium storing instructions executable by a computational device, wherein the instructions comprise instructions to:
receive peak viewership parameters for modeling program channels with respect to an existing program channel line-up of programs delivered from a program delivery network to customer premises equipment (CPE) of subscribers according to a Quadrature Amplitude Modulation (QAM) delivery channel format;
query a device that stores viewership data based on the peak viewership parameters;
determine a peak viewership for a plurality of program channels based on a response to a query of the device;
query another device that stores network configuration data pertaining to a set of backend network devices of the program delivery network, based on peak viewership data obtained from a determination of the peak viewership;
obtain channel path information for the plurality of program channels, based on a mapping of the set of backend network devices and a plurality of links to a set of CPE devices used to provide each program channel to a set top box;
generate peak channel delivery data based on the channel path information and the peak viewership data; and
simulate, based on the peak channel delivery data, resource utilization across a portion of the program delivery network that includes a subset of the backend network devices and the CPE devices determined to be substantially a constant in each channel delivery instance for a particular program channel, including:
bandwidth requirements associated with adding, to the existing program channel line-up, one or more other program channels provisioned for another program to be delivered according to the QAM delivery channel format, and
multicast bandwidth requirements and unicast bandwidth requirements associated with moving one or more of the programs, delivered via a set of the program channels, from the program channel line-up, for delivery according to an Internet Protocol television (IPTV) delivery channel format that is different from the first type of delivery channel format, to another set of program channels.

18. The non-transitory storage medium of claim 17, wherein the instructions comprise instructions to:
simulate the resource utilization in relation to one or more user-designated, identified network devices in the portion of the program delivery network.

19. The non-transitory storage medium of claim 17, wherein the instructions comprise instructions to:
identify set top boxes tuned to one or more of the plurality of program channels during a peak viewership time period.

20. The non-transitory storage medium of claim 17, wherein the instructions comprise instructions to:
generate one or more reports that include information pertaining to the resource utilization across the portion of the program delivery network based on the simulation.

* * * * *